United States Patent
Pedersen et al.

(10) Patent No.: US 9,673,919 B2
(45) Date of Patent: Jun. 6, 2017

(54) SYSTEMS, METHODS, AND DEVICES FOR EVALUATING SIGNAL QUALITY AND RANGE

(75) Inventors: Shawn Murray Edward Pedersen, Squamish (CA); Brian Eric Aikens, Garibaldi Highlands (CA); Loren Thomas Parfitt, Squamish (CA)

(73) Assignee: Echoflex Solutions Inc., Squamish, British Columbia (CA)

( * ) Notice: Subject to any disclaimer, the term of this patent is extended or adjusted under 35 U.S.C. 154(b) by 1096 days.

(21) Appl. No.: 13/466,250

(22) Filed: May 8, 2012

(65) Prior Publication Data

US 2013/0300643 A1    Nov. 14, 2013

(51) Int. Cl.
*G06F 3/01* (2006.01)
*H04B 17/309* (2015.01)
*H04B 17/23* (2015.01)
*H04B 17/24* (2015.01)

(52) U.S. Cl.
CPC ........... *H04B 17/309* (2015.01); *H04B 17/23* (2015.01); *H04B 17/24* (2015.01)

(58) Field of Classification Search
CPC   G08B 5/22; G08B 1/08; H04W 24/00; H04B 1/00; H04B 17/00; H04M 11/00; H04K 3/00
See application file for complete search history.

(56) References Cited

U.S. PATENT DOCUMENTS

| | | | |
|---|---|---|---|
| 6,011,487 A | | 1/2000 | Plocher |
| 7,020,442 B2 | | 3/2006 | Najafi et al. |
| 7,680,460 B2 | | 3/2010 | Nelson et al. |
| 7,764,171 B2 | | 7/2010 | Cheng et al. |
| 2002/0081977 A1 | * | 6/2002 | McCune, Jr. ............... 455/67.1 |
| 2010/0182157 A1 | | 7/2010 | Shaffer et al. |
| 2010/0330943 A1 | | 12/2010 | Hoepfner |
| 2011/0085158 A1 | | 4/2011 | Motter et al. |
| 2011/0086632 A1 | | 4/2011 | Tumey et al. |
| 2012/0003942 A1 | | 1/2012 | Grunert et al. |
| 2012/0015665 A1 | | 1/2012 | Farley et al. |

FOREIGN PATENT DOCUMENTS

KR    20100010779    2/2010

* cited by examiner

*Primary Examiner* — Tony N Ngo
(74) *Attorney, Agent, or Firm* — Michael Best & Friedrich LLP

(57) ABSTRACT

Systems, methods, and devices for evaluating wireless signal quality between environmental sensing and control devices. A signal quality device includes a sensor module, one or more user control devices, one or more display devices, and a processing unit. The signal quality device is configured to generate a first signal following activation of at least one of the one or more user control devices, wirelessly transmit the first signal, receive a second signal in response to the first signal, and activate the one or more display devices to provide an indication of the signal quality of the first signal. A wireless environmental controller includes a processing unit and is configured to receive the first signal, determine the signal quality of the first signal, generate the second signal related to the signal quality of the first signal, and wirelessly transmit the second signal.

14 Claims, 9 Drawing Sheets

SYSTEMS, METHODS, AND DEVICES FOR EVALUATING SIGNAL QUALITY AND RANGE

BACKGROUND

The invention relates to the deployment of wireless environmental control or sensing devices and the evaluation of signals transmitted between the devices and a controller.

Successful deployment of wireless devices within a space ensures that the wireless connection between them is robust and reliable. However, construction materials such as wood, plaster, glass, brick, medium-density fibreboard ("MDF"), and metal within, for example, the walls, ceilings, and furniture of a building may disrupt communication between wireless devices. Other wireless communication devices (e.g., sources of radio-frequency signals) may also disrupt communication between the wireless devices. Testing the signal quality and range of wireless signals is not a simple process, and typically requires additional personnel or the use of specialized tools, which electricians and other installation personnel do not typically carry. Specialized tools include, for example, a laptop computer or a personal computer having specialized signal analysis software. Such tools and software require, among other things, specialized training to ensure that a signal is analyzed and interpreted correctly.

SUMMARY

The testing and confirmation of wireless signal quality and range between devices in a wireless communications network enhances the deployment of, for example, wireless environmental sensors within a space. The devices communicate directly with one another and function as diagnostic tools for evaluating signal quality and range and providing a user with an indication of the signal quality and range of the signals transmitted between the devices. Specialized training and software is not required to test the wireless signal quality and range of the signals transmitted between the devices.

In one embodiment, the invention provides a system for evaluating wireless signal quality between environmental sensing and control devices. The system includes a signal quality device and a wireless environmental controller. The signal quality device includes a sensor module, a user input device, a display device, and a processing unit. The signal quality device is configured to generate a first signal following activation of the user input device, wirelessly transmit the first signal, and receive a second signal in response to the first signal. The second signal is related to a signal quality of the first signal. The signal quality device is also configured to activate the display device to provide an indication of the signal quality of the first signal. The wireless environmental controller includes a processing unit and is configured to receive the first signal, determine the signal quality of the first signal, generate the second signal related to the signal quality of the first signal, and wirelessly transmit the second signal.

In another embodiment, the invention provides a system for evaluating signal quality of a wireless signal. The system includes a signal quality device and a wireless environmental controller. The signal quality device includes a user control device, a display device, and a processing unit. The signal quality device is configured to generate a first signal following activation of the user control device, wirelessly transmit the first signal, and receive a second signal in response to the first signal. The second signal is related to a signal quality of the first signal. The signal quality device is also configured to activate the display device to provide an indication of the signal quality of the first signal. The wireless environmental controller includes a processing unit and is configured to receive the first signal, determine the signal quality of the first signal, generate the second signal related to the signal quality of the first signal, and wirelessly transmit the second signal.

In another embodiment, the invention provides a method for evaluating wireless signal quality between environmental sensing and control devices. The method includes generating a first signal following activation of a user input device and wirelessly transmitting the first signal. The first signal is received at a wireless environmental controller, signal quality of the first signal is determined at the wireless environmental controller, a second signal related to the signal quality of the first signal is generated in response to the first signal, and the second signal is wirelessly transmitted. The second signal is received at a signal quality device. The second signal is then evaluated at the signal quality device, and a display device is activated to provide an indication of the signal quality of the first signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
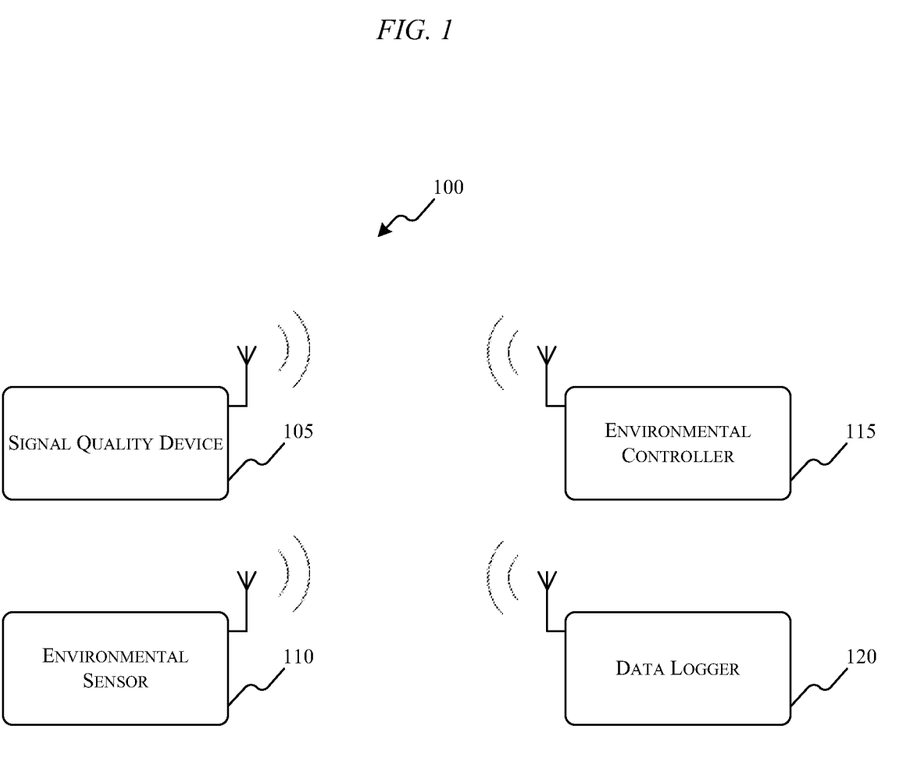
FIG. 1 illustrates a wireless environmental control system according to an embodiment of the invention.

A system 100 includes a signal quality device 105, an environmental sensor 110, an environmental controller 115, and a data logger 120, as shown in FIG. 1. Each of the signal quality device 105, the environmental sensor 110, the environmental controller 115, and the data logger 120 is an electronic device configured for wireless communication (e.g., radio frequency ["RF"] communication). In some constructions, the devices within the system 100 also include an embedded energy harvesting technology, as described below. During installation or troubleshooting of the signal quality device 105 or environmental sensor 110, the signal quality device 105 is used to initiate the testing of the wireless signal quality and range between the signal quality device 105 or the environmental sensor 110 and the controller 115, and display the results. Additionally or alternatively, the data logger 120 initiates the wireless signal quality and range test and displays the results. The data logger 120 is configured to save (or log) messages exchanged between the signal quality device 105, the environmental sensor 110, and the environmental controller 115 for access at a later time. Each of the devices in the system 100 can include combinations of hardware and software to implement the various modules and components described herein with respect to each device.

Figure 2:
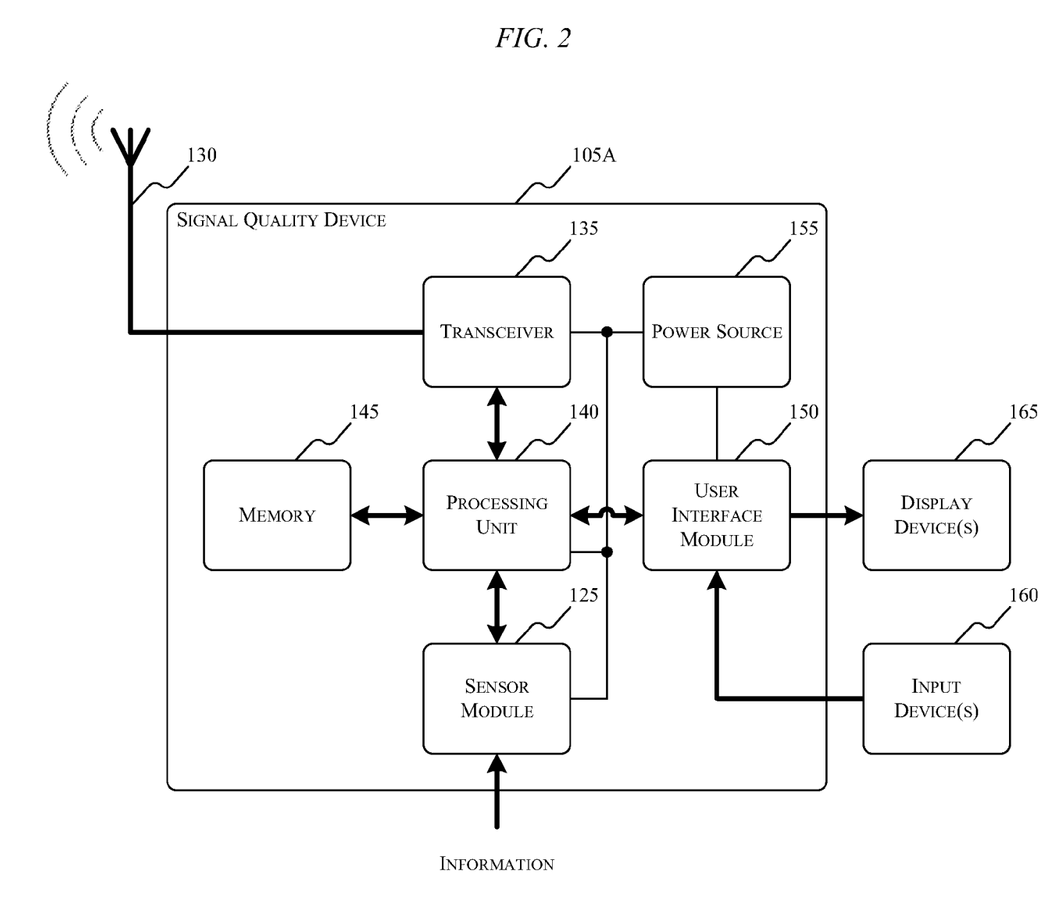
FIG. 2 illustrates a signal quality device capable of being used in the system of FIG. 1.

In some constructions, an environmental sensor is implemented within or connected to the signal quality device 105, as shown in FIG. 2 and described below. The signal quality device 105 is configured to support bidirectional wireless communication with the environmental controller 115, and the environmental controller 115 is configured to support bidirectional wireless communication with the signal quality device 105. Testing of the wireless signal quality and range is initiated upon receiving a manual or automatic command at the signal quality device 105, and the signal quality device 105 transmits a wireless signal (e.g., an RF signal) to the environmental controller 115. The environmental controller 115 determines the quality of the received wireless signal and transmits the results back to the signal quality device 105 for display to the user.

For example, FIG. 2 illustrates a signal quality device 105A that includes a sensor module 125, an antenna 130, a transceiver 135, a processing unit or controller 140 (e.g., a microprocessor, a microcontroller, an ASIC, etc.), a memory module 145, a user interface module 150, a power source 155, one or more input devices 160, and one or more display devices 165. The power source 155 provides power to the components of the signal quality device 105A. In some embodiments, wireless energy harvesters, such as those available from EnOcean GmbH, Oberhaching Germany, are used to power the signal quality device 105A. The memory module 145 includes, for example, random-access memory ("RAM"), read-only memory ("ROM"), electrically erasable programmable read-only memory ("EEPROM"), flash memory, etc., and stores executable instructions for performing the methods and processes described herein. The transceiver 135 and the antenna 130 are used to transmit and receive wireless signals with other electronic devices in the system 100.

The processing unit 140 retrieves and executes the instructions stored in the memory module 145 to generate control signals in response to the sensor readings and to broadcast or transmit wireless control signals to the environmental controller 115 via the transceiver 135 and the antenna 130. The sensor module 125 may include one environmental sensor 110 or a combination of several environmental sensors 110. The environmental sensors can include, for example, occupancy (or vacancy) sensors, proximity (or presence) sensors, sound and vibration sensors, thermal sensors, heat sensors, temperature sensors, moisture sensors, humidity sensors, door (or window) contact sensors, photo (or LUX) sensors, carbon dioxide sensors, carbon monoxide detectors, gas detectors, electric current sensors, electric potential sensors, magnetic sensors, radio sensors, pressure sensors, force (or weight) sensors, position sensors, angle sensors, displacement sensors, distance sensors, flow sensors, etc.

A user initiates a test by activating one or more of the input devices 160 on the signal quality device 105A. In other implementations, the test is activated automatically (e.g., after turning on the signal quality device 105). The processing unit 140 retrieves and executes the instructions stored in the memory 145 to generate a control signal in response to the user command and broadcasts the control signal to the environmental controller 115. In response to the transmitted control signal, the signal quality device 105A receives a second signal from the environmental controller 115. The processing unit 140 evaluates the second signal and activates the one or more display devices 165 in response to the signal from the controller 115 to display an indication of the wireless signal quality and range to the user. The input devices 160 on the signal quality device 105A may include, for example, switches, buttons, a touch-screen interface, etc. In some constructions, the input devices 160 include a single button. The display devices 165 on the signal quality device 105 may include one or more light-emitting diodes ("LEDs"), a liquid crystal display ("LCD"), or a combination thereof. In some constructions, the display devices 165 include a single multi-color LED assembly that displays information according to a color code. In other constructions, a blink code is used to provide an indication of signal quality. For example, a green illuminated LED indicates that the signal quality is good (e.g., greater than a first signal quality threshold value [e.g., between approximately −45 db and −65 db]), a yellow illuminated LED indicates that the signal quality is okay (e.g., less than the first signal quality threshold but greater than a second signal quality threshold value [e.g., between approximately −65 db and −85 db]), and a red illuminated LED indicates that the signal quality is poor (e.g., less than the second signal quality threshold value [e.g., less than approximately −85 db]). In some implementations, if the signal quality device 105A does not receive the second signal after a predetermined period of time (e.g., within five seconds or another time period within which the second signal is expected to be received), the LED is illuminated to indicate that no signal was received. In other constructions, the display devices 165 include an LCD displaying the results of testing in the form of a message or a graphical representation (e.g., numerically, bar graph, etc.). In some implementations, the signal quality device 105A evaluates the quality of the second signal (e.g., to determine the quality of the signal return path, transmitting power of the controller, etc.) and compares it to the received quality of the first signal.

Figure 3:
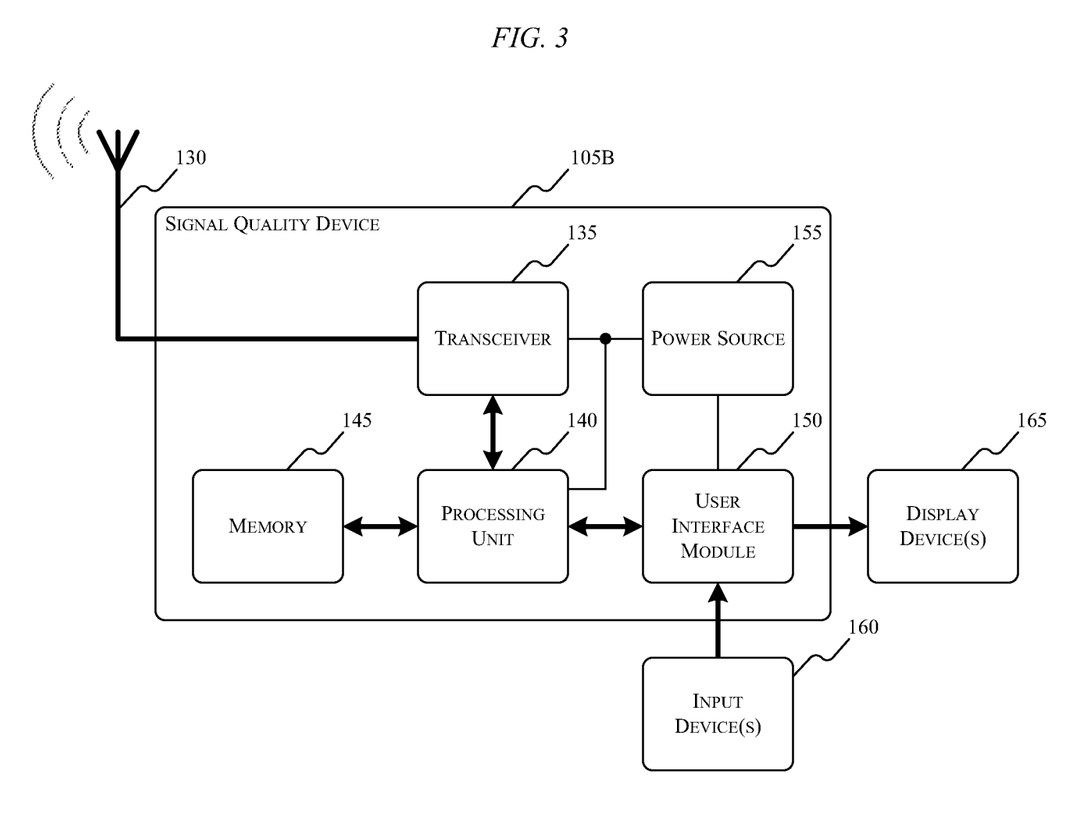
FIG. 3 illustrates a signal quality device according to another construction of the invention.

FIG. 3 illustrates a signal quality device 105B without sensor electronics. The signal quality device 105B of FIG. 3 includes the antenna 130, the transceiver 135, the processing unit or controller 140, the memory module 145, the user interface module 150, the power source 155, the one or more input devices 160, and the one or more display devices 165, as described above. In such a construction, the signal quality device 105B is used as a separate diagnostic tool during the installation and troubleshooting of the environmental sensor 110 and controller 115. The user initiates testing of the quality of a wireless connection by activating one or more of the input devices 160. The processing unit 140 retrieves and executes instructions stored in memory 145 to generate a control signal in response to the activation and to broadcast or transmit the control signal to the environmental controller 115. In response to the transmitted control signal, the signal quality device 105B receives the test results from the environmental controller 115 and displays the results to the user via the one or more display devices 165, as described above with respect to the signal quality device 105A. When the signal quality device 105B is configured as shown in FIG. 3, the environmental sensor 110 communicates independently with the environmental controller 115. As described above, the environmental sensor 110 may be a single sensor or a combination of several sensors.

In some embodiments, the signal quality device 105B sends a message to the environmental sensor 110 to initiate testing of the quality of the wireless connection between the environmental sensor 110 and the environmental controller 115. The environmental sensor 110 and the environmental controller 115 communicate to determine the signal quality and range of the wireless communication, as described above with respect to the signal quality device 105A. When the test is complete, the environmental sensor 110 communicates the test results back to the signal quality device 105B to be displayed.

Figure 4:
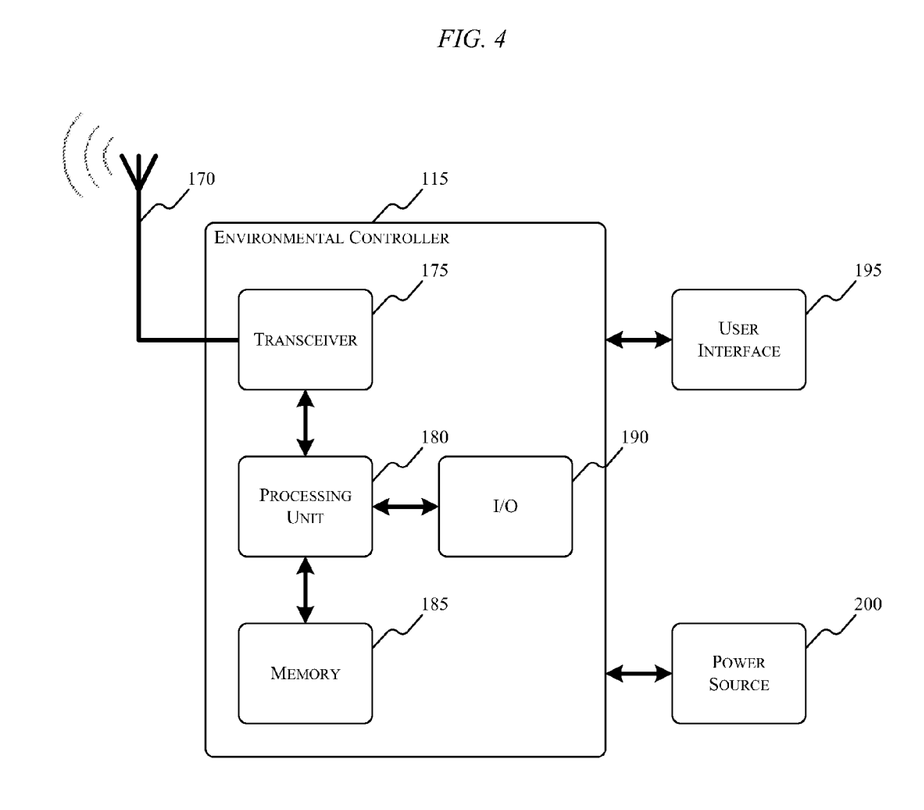
FIG. 4 illustrates an environmental controller capable of being used in the system of FIG. 1.

The environmental controller 115 of FIG. 4 includes an antenna 170, a transceiver 175, a processing unit 180, a memory 185, an input/output ("I/O") module 190, a user interface 195, and a power source 200. The environmental controller 115 may be, for example, a receiver, a gateway device, an interface device, a bi-directional communication device, a centralized computing system, etc. The power source 200 provides power to the components of the environmental controller 115. In some constructions, the power source 200 receives power from an external alternating current ("AC") or from an internal direct current ("DC") power supply. In other constructions, the power source 200 is an energy harvester, as described above. The memory module 185 includes, for example, RAM, ROM, EEPROM, flash memory, etc., and stores executable instructions for performing the methods and processes described herein. The user interface 195 may include a knob, a dial, a switch, a button, a fader, a display, a touch-screen interface, etc. The transceiver 175 and the antenna 170 are used to transmit and receive wireless signals with other electronic devices in the system 100. The data logger 120 (e.g., a laptop) includes a combination of hardware and software similar to the environmental controller 115. In some constructions, the data logger 120 is included in the signal quality device 105, the environmental sensor 110, or the environmental controller 115.

During operation, the environmental controller 115 receives wireless signals based on the sensor readings of the environmental sensor 110 or signal quality device 105. The processing unit 180 retrieves and executes the instructions stored in the memory 185 to generate and output control signals to, for example, a fixture or a device in response to the received signals. In some implementations, the environmental controller 115 controls a lighting fixture to be turned on or off based on an amount of light detected by the environmental sensor 110 or the signal quality device 105.

When deploying the environmental sensor 110 or the signal quality device 105, the environmental controller 115 determines the wireless signal quality and range between the environmental sensor 110 or signal quality device 105 and controller 115. The environmental controller 115 is configured for bidirectional wireless communication (e.g., RF communication) with the signal quality device 105 and the environmental sensor 110. In one implementation, the environmental controller 115 receives one or more sub-telegrams or sub-signals from the signal quality device 105 and/or the environmental sensor 110. For example, the sub-telegrams are redundant RF messages that are transmitted at the same time to compensate for the possibility of a collision between messages. The processing unit 180 of the environmental controller 115 counts the number of sub-telegrams successfully received and uses them in determining the signal quality and range of the received wireless signal (e.g., the signal quality of each sub-telegram, the number of sub-telegrams received, etc.). Determining the signal quality of multiple signals or each received sub-telegram provides redundancy in evaluating signal quality. The processing unit 180 evaluates the sub-telegrams to determine the signal quality (e.g., in decibels) of the received wireless signal. For example, a signal level or signal strength of the sub-telegrams are compared to the one or more threshold values described above. When the signal quality test is completed, the environmental controller 115 communicates the results back to the signal quality device 105 for display to the user. When an environmental sensor is included in or connected to the signal quality device 105, the environmental controller 115 communicates directly with the signal quality device 105A of FIG. 2. When the environmental sensor 110 is separated from the signal quality device 105, the environmental controller 115 can communicate independently with the environmental sensor 110 and the signal quality device 105B. In other constructions, the environmental controller 115 is configured in a manner similar to the signal quality device 105A described above. For example, a signal quality test is initiated at the environmental controller 115, and a signal is generated and sent to the environmental sensor 110 or signal quality device 105A/105B. The environmental sensor 110 or the signal quality device 105A/105B evaluates the signal from the environmental controller 115, and generates and transmits the second signal. The environmental controller 115 receives the second signal, evaluates the second signal, and provides an indication of the signal quality of the first signal.

Figure 5:
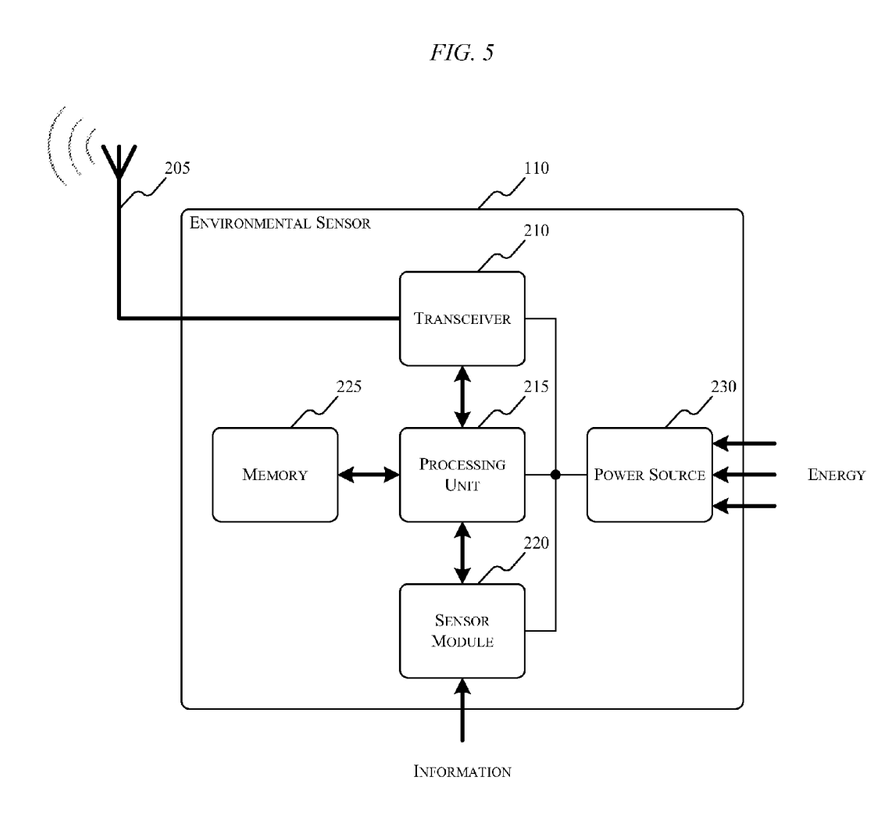
FIG. 5 illustrates an environmental sensor capable of being used in the system of FIG. 1.

FIG. 5 illustrates the environmental sensor 110 communicating with the environmental controller 115 of FIG. 4. The environmental sensor 110 includes an antenna 205, a transceiver 210, a processing unit 215, sensor module 220, a memory 225, and a power source 230. The power source 230 provides power to the components of the sensor 110. In some constructions, the sensor 110 harvests energy from energy sources within the environment to power the sensor device 110, as described above with respect to the signal quality device 105. For example, the power supply may be an internal solar module including photo cells. During operation, the sensor module 220 periodically or continuously measures conditions within the surrounding environment. The processing unit 215 retrieves and executes instructions stored in the memory 225 to generate control signals in response to the sensor readings and to broadcast or transmit wireless control signals to the environmental controller 115 or other electronic devices in the system 100 via the transceiver 210 and the antenna 205.

Figure 6A:
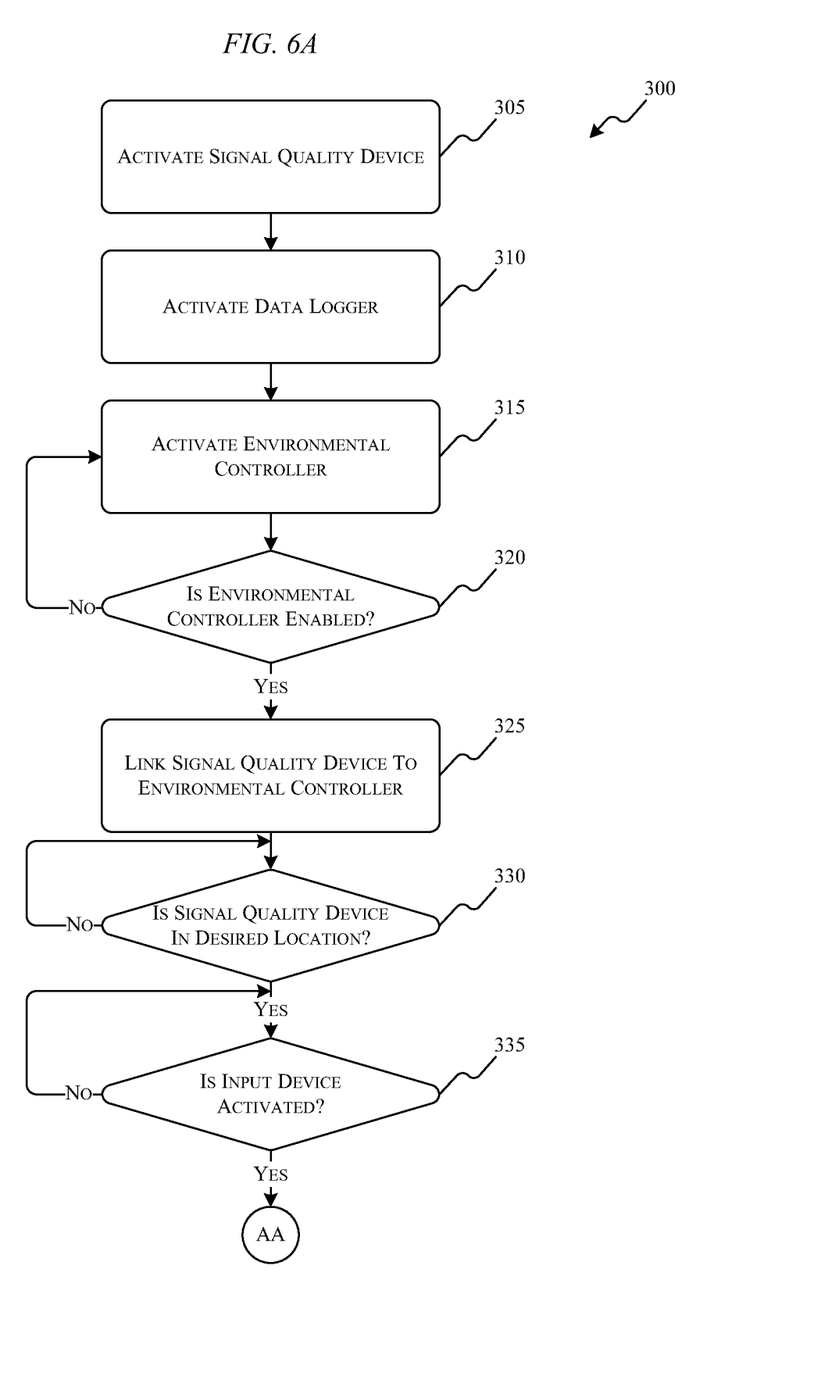
FIGS. 6A-6D show a process for evaluating wireless signal quality and range.

FIGS. 6A-6D illustrate a process 300 for testing the wireless signal quality and range between the signal quality device 105A and the environmental controller 115. Various steps of the process 300 are capable of being executed simultaneously, in parallel, or in an order that differs from the illustrated manner of execution. As illustrated in FIG. 6A, the first steps of the process 300 are to enable or activate the signal quality device 105A (step 305), the data logger 120 (step 310), and the environmental controller 115 (step 315). The data logger 120 is enabled when there is a desire to log or save sensor positions or the messages exchanged between the electronic devices during testing. If the environmental controller 115 is enabled or activated (step 320), the signal quality device 105A communicatively links to the environmental controller 115 (step 325). If the environmental controller 115 is not enabled or activated, the process 300 returns to step 315. If the signal quality device 105A is placed in a desired location (e.g., a location at which the signal quality is greater than a threshold value) (step 330), the process 300 continues to step 335. If the signal quality device 105 is not placed in a desired location, the process 300 returns to step 330. At step 335, if at least one of the input devices 160 is actuated, the process 300 proceeds to section AA shown in and described with respect to FIG. 6B. If the one or more input devices 160 are not activated (step 335), the process 300 returns to step 335.

Figure 6B:
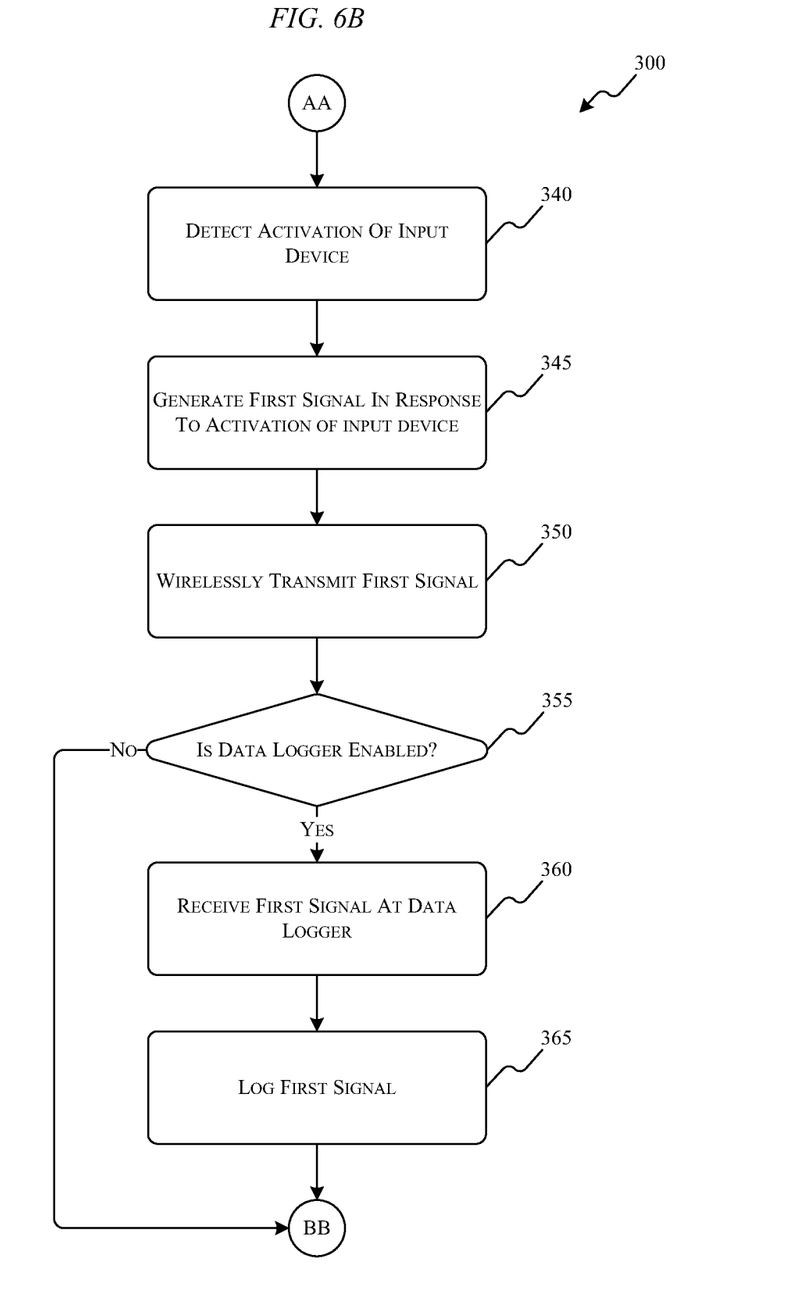

With reference to FIG. 6B, the processing unit 140 detects activation of the one or more input devices 160 (step 340), generates a first signal in response to the user command (step 345), and transmits the first signal wirelessly (step 350). If the data logger 120 is enabled (step 355), the data logger 120 receives (step 360) and logs (step 365) the first signal. If the data logger 120 is not enabled, the process proceeds to section BB shown in and described with respect to FIG. 6C.

Figure 6C:
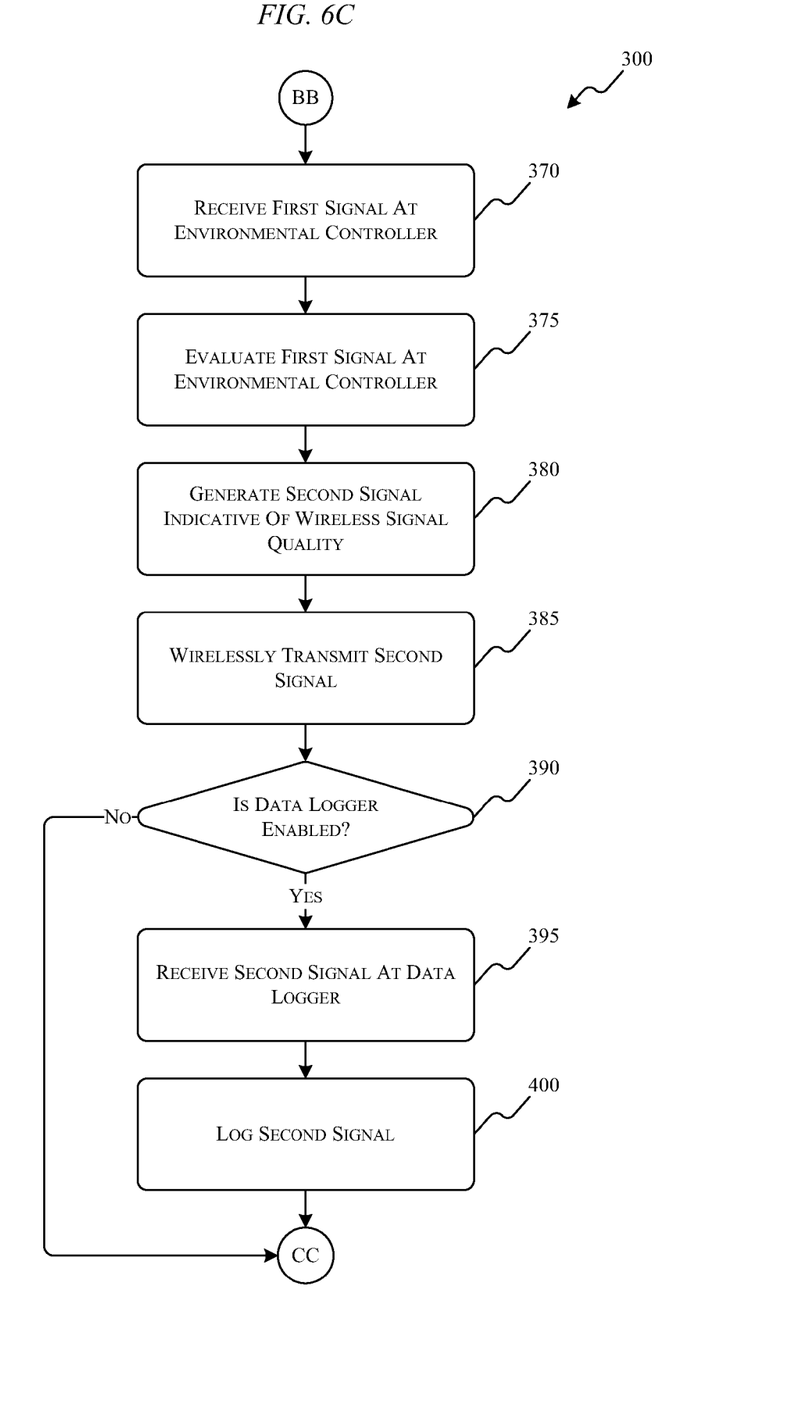

With reference to FIG. 6C, the first signal is received (step 370) and evaluated (step 375) by the environmental controller 115. The environmental controller 115 then generates (step 380) and transmits (step 385) a second signal indicative of a wireless signal quality. If the data logger 120 is enabled (step 390), the data logger 120 receives (step 395) and logs (step 400) the second signal. If the data logger 120 is not enabled, the process proceeds to section CC shown in and described with respect to FIG. 6D.

Figure 6D:
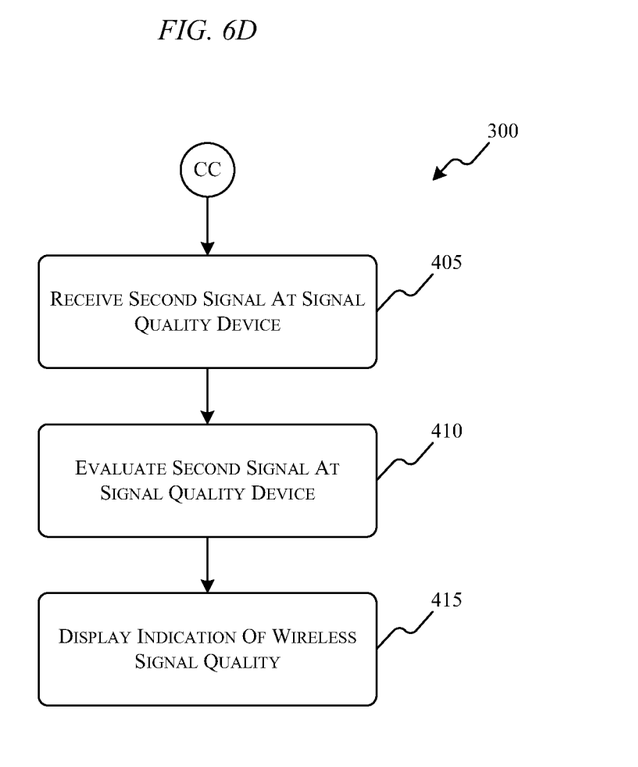

With reference to FIG. 6D, the signal quality device 105 receives (step 405) and evaluates (step 410) the second signal, and the signal quality device 105 activates the one or more display devices 165 to provide an indication of the wireless signal quality on the signal quality device 105 (step 415). The range of the wireless communication between devices in the system 100 can be determined, for example, based on the signal quality.

Thus, the invention provides, among other things, systems, methods, and devices for evaluating wireless signal quality and range between environmental control devices, such as an environmental sensor and an environmental controller. Various features and advantages of the invention are set forth in the following claims.

What is claimed is:

1. A system for evaluating signal quality of a wireless signal, the system comprising:
    a signal quality device including a user control device, a display device, and a processing unit, the signal quality device configured to
        generate a first signal following activation of the user control device,
        wirelessly transmit the first signal,
        receive a second signal in response to the first signal, the second signal related to the signal quality of the first signal, and
        activate the display device to provide an indication of the signal quality of the first signal; and
    a wireless environmental controller including a processing unit and configured to
        receive the first signal,
        determine the signal quality of the first signal,
        generate the second signal in response to the first signal, the second signal being related to the signal quality of the first signal, and
        wirelessly transmit the second signal.

2. The system of claim 1, wherein the display device includes a light-emitting diode ("LED").

3. The system of claim 1, wherein the signal quality device further includes a sensor module.

4. The system of claim 3, wherein the sensor module includes at least one environmental sensor.

5. The system of claim 1, wherein the wireless environmental controller is further configured to compare a signal level of the first signal to one or more threshold values.

6. The system of claim 1, further comprising a data logging device configured to receive and log at least one of the first signal and the second signal.

7. A method of evaluating wireless signal quality between environmental sensing and control devices, the method comprising:
    generating a first signal following activation of a user control device;
    wirelessly transmitting the first signal;
    receiving the first signal at a wireless environmental controller;
    determining a signal quality of the first signal at the wireless environmental controller;
    generating a second signal related to the signal quality of the first signal, the second signal being generated in response to the first signal;
    wirelessly transmitting the second signal;
    receiving the second signal at a signal quality device;
    evaluating the second signal at the signal quality device; and
    activating a display device to provide an indication of the signal quality of the first signal.

8. The method of claim 7, wherein the signal quality device includes a sensor module.

9. The method of claim 8, wherein the sensor module includes at least one environmental sensor.

10. The method of claim 7, wherein the first signal includes a plurality of sub-signals, and determining the signal quality of the first signal includes determining a signal quality of each of plurality of sub-signals received at the wireless environmental controller.

11. The method of claim 7, wherein the display device includes a light-emitting diode ("LED").

12. The method of claim 11, wherein activating the display device includes illuminating the LED to indicate the signal quality of the first signal.

13. The method of claim 7, further comprising receiving and logging at least one of the first signal and the second signal at a data logging device.

14. The method of claim 7, wherein determining the signal quality of the first signal includes comparing a signal level of the first signal to one or more threshold values.

* * * * *